(12) United States Patent
Nicolay et al.

(10) Patent No.: US 6,449,935 B1
(45) Date of Patent: Sep. 17, 2002

(54) LAWNMOWER HANDLE ASSEMBLY

(75) Inventors: Kenneth M. Nicolay, 5528 Tahoe La., Fairway, KS (US) 66205; Lawrence E. Guerra, Roeland Park, KS (US); Theresa R. Henry, Lenexa, KS (US)

(73) Assignee: Kenneth M. Nicolay, Fairway, KS (US)

( * ) Notice: Subject to any disclaimer, the term of this patent is extended or adjusted under 35 U.S.C. 154(b) by 0 days.

(21) Appl. No.: 09/707,639

(22) Filed: Nov. 7, 2000

(51) Int. Cl.$^7$ .............................................. A01D 34/66
(52) U.S. Cl. ........................................................ 56/16.7
(58) Field of Search ........................ 56/1, 2, 16.7, 17.2, 56/17.5, 17.1, 16.8, 320.1, DIG. 9, DIG. 18; 280/727, 47.34, 47.35

(56) References Cited

U.S. PATENT DOCUMENTS

| | | |
|---|---|---|
| 857,859 A | 6/1907 | Barney |
| 1,201,721 A | 10/1916 | Hagquist |
| 1,368,503 A | 2/1921 | Kallauner |
| 2,421,558 A | 6/1947 | Goldsmith |
| 2,477,442 A | 7/1949 | Cramer, Jr. et al. |
| 3,243,196 A | 3/1966 | Amis |
| 3,564,823 A | * 2/1971 | Rhoads ........................ 56/16.7 |
| 4,077,191 A | * 3/1978 | Pittinger, Sr. et al. ....... 56/12.7 |
| 4,678,042 A | * 7/1987 | Barton et al. ................. 172/15 |
| 5,761,887 A | * 6/1998 | Hanson ............................ 56/1 |

* cited by examiner

Primary Examiner—Robert E. Pezzuto
(74) Attorney, Agent, or Firm—Shughart Thomson & Kilroy, P.C.

(57) ABSTRACT

An improved handle assembly for an appliance such as a lawnmower having front and rear wheels includes a handlebar which is pivotally connected to the appliance through at least one mounting point proximate the front wheels and which extends upwardly and rearwardly until it terminates with a generally horizontal push bar adapted for gripping by the operator. The handlebar preferably includes an arcuate bend which decreases the angle at which the upper portion of the handlebar rises toward the push bar. The handle assembly also includes a handle height control mechanism which is connected at a lower end to the appliance proximate the rear wheels and at an upper end to the handlebar. The handle height control mechanism allows the handlebar to pivot about the front mounting point through a limited range of movement.

27 Claims, 5 Drawing Sheets

LAWNMOWER HANDLE ASSEMBLY

BACKGROUND OF THE INVENTION

1. Field of the Invention

The present invention relates to a handle assembly for lawnmowers and other wheeled appliances designed to be pushed by a human operator.

2. Description of the Related Art

Power lawnmowers designed to be pushed by a human being have traditionally been manufactured with a handle assembly connected to the mower deck proximate the rear wheels of the mower. The handlebars of these mowers are generally angled forward and downward at an angle of approximately 45 degrees. This means that when an operator applies a force along the handlebar, roughly one half of the force is directed downward instead of being directed forward to push the mower in the desired direction of travel, and the effect is even more pronounced when the operator attempts to push the mower up a hill or incline. This waste of effort causes the operator to suffer from unnecessary fatigue and makes the job of mowing more onerous than need be.

Currently, the primary options available to ease the strenuous burden of pushing a lawnmower involve purchasing self-propelled or riding mowers or hiring a lawn service to mow the lawn, all of which add to the expense of mowing. There remains the need for a simple yet inexpensive means for easing the burden of pushing a lawnmower, particularly up hills.

SUMMARY OF THE INVENTION

The present invention comprise an improved handle assembly for an appliance such as a lawnmower having front and rear wheels and which is adapted for pushing by a human operator. The handle assembly includes a handlebar which is connected to the mower deck through at least one mounting point proximate the front wheels and which extends upwardly and rearwardly until it terminates with a generally horizontal push bar adapted for gripping by the operator.

By mounting the handlebar to the mower deck at a position proximate the front wheels of the mower, the angle of the handlebar with respect to horizontal is reduced significantly, to something on the order of 25 degrees. This decrease in the angle of the handlebar results in a reduction of approximately 22 percent in the amount of force directed along the handlebar which is required to propel the mower forward. This labor saving effect can be increased by arcuately bowing the handlebar so that the angle of the upper portion of the handlebar is reduced to approximately 20 degrees, producing an overall savings in the force required to push the mower of approximately 25 percent. Pushable appliances other than lawnmowers such as handcarts and dollies can also benefit from the advantages obtained by use of a front-mounted handle assembly.

The handlebar is preferably pivotally mounted to the mower deck so that the mower deck can rise and fall with the terrain of the lawn while keeping the height of the push bar at a constant level which is comfortable for the operator. When the handlebar is so pivotally mounted, the handle assembly also includes a handle height control mechanism which is connected at a lower end to the appliance proximate the rear wheels and at an upper end to the handlebar at a point intermediate the front mounting point and the push bar. The handle height control mechanism allows the handlebar to pivot about the front mounting point through a limited range of movement. One embodiment of the handle height control mechanism includes a pair of telescoping assemblies, each of which has an inner member slidably received within an outer member; the outer member being pivotally connected to the appliance and the inner member being pivotally connected to the handlebar. The outer member includes an upper limit stop and a lower limit stop, and the inner member includes a plurality of longitudinally spaced adjustment holes which receive first and second limit stop pins. The first limit stop pin is inserted into one of the adjustment holes above the upper limit stop and the second limit stop pin is inserted into one of the adjustment holes below the lower limit stop. The first limit stop pin engages the upper limit stop to prevent further downward movement of the handlebar when it reaches the lower limit of its selected range of movement and the second limit stop pin engages the lower limit stop to prevent further upward movement of the handlebar when it reaches the upper limit of its selected range of movement.

OBJECTS AND ADVANTAGES OF THE INVENTION

The principal objects and advantages of the present invention include: providing a handle assembly for lawnmowers and other pushable appliances which reduces the effort required to push the appliance; providing such a handle assembly which allows for accurate and easy maneuvering of the appliance; providing such a handle assembly which can be can be sold either as original equipment on an appropriate appliance or as an aftermarket add-on; and providing such a handle assembly which is economical to manufacture, efficient in operation, capable of long operating life and particularly well-adapted for the proposed usage thereof.

DETAILED DESCRIPTION OF THE PREFERRED EMBODIMENT

Figure 1:
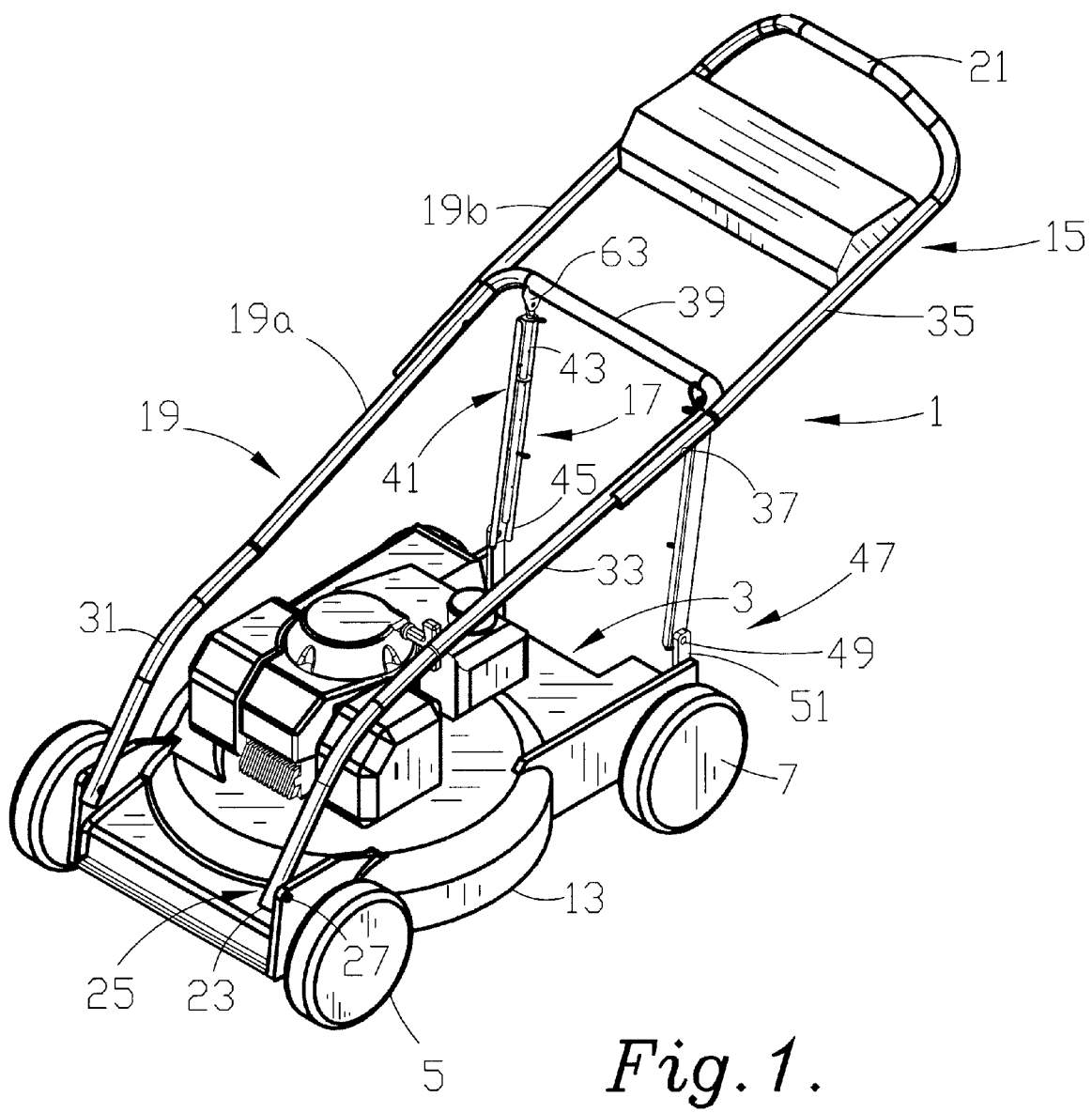
FIG. 1 is a perspective view of a lawnmower equipped with a handle assembly embodying the present invention.
Figure 2:
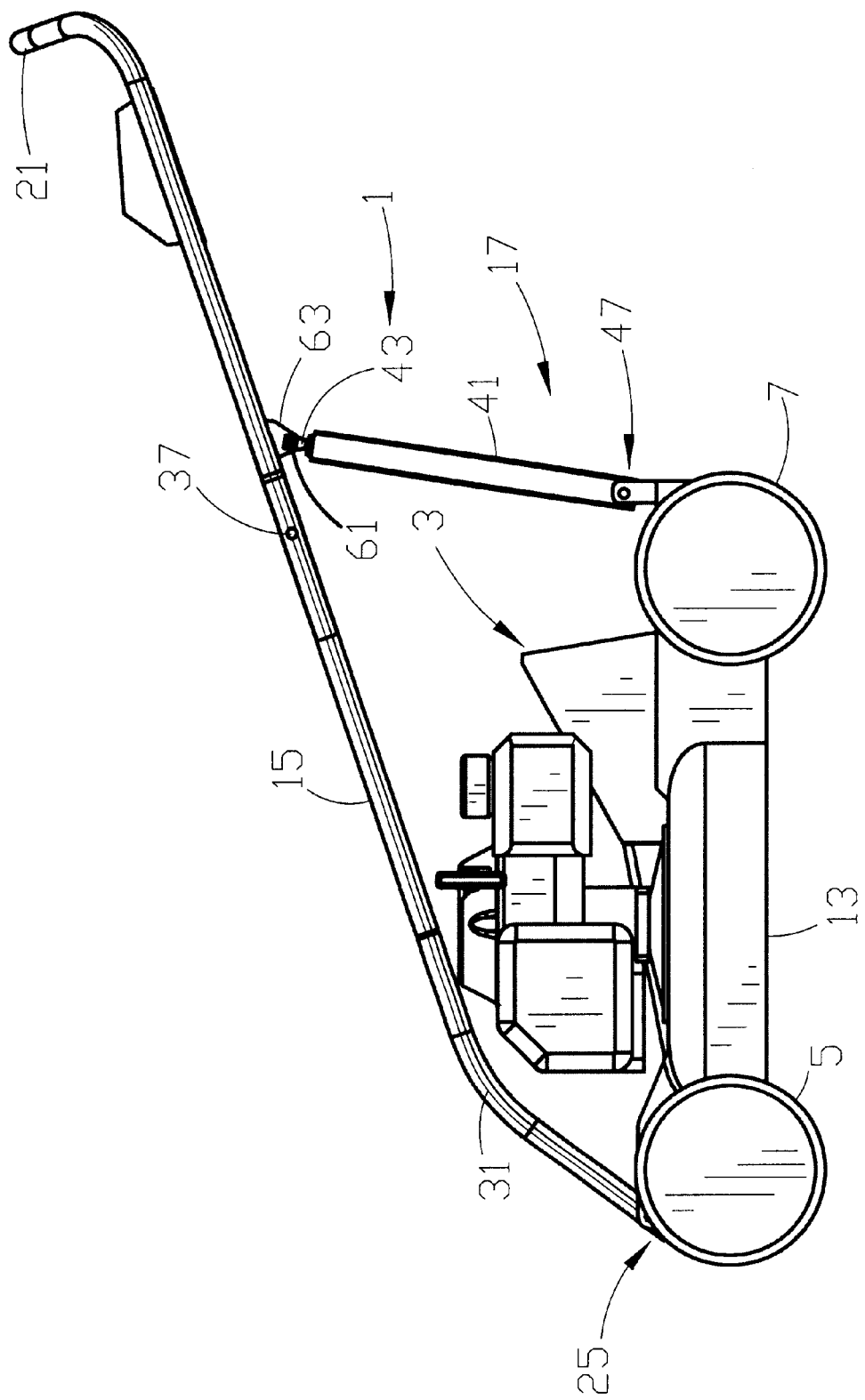
FIG. 2 is a side view of the lawnmower and handle assembly of FIG. 1.
Figure 3:
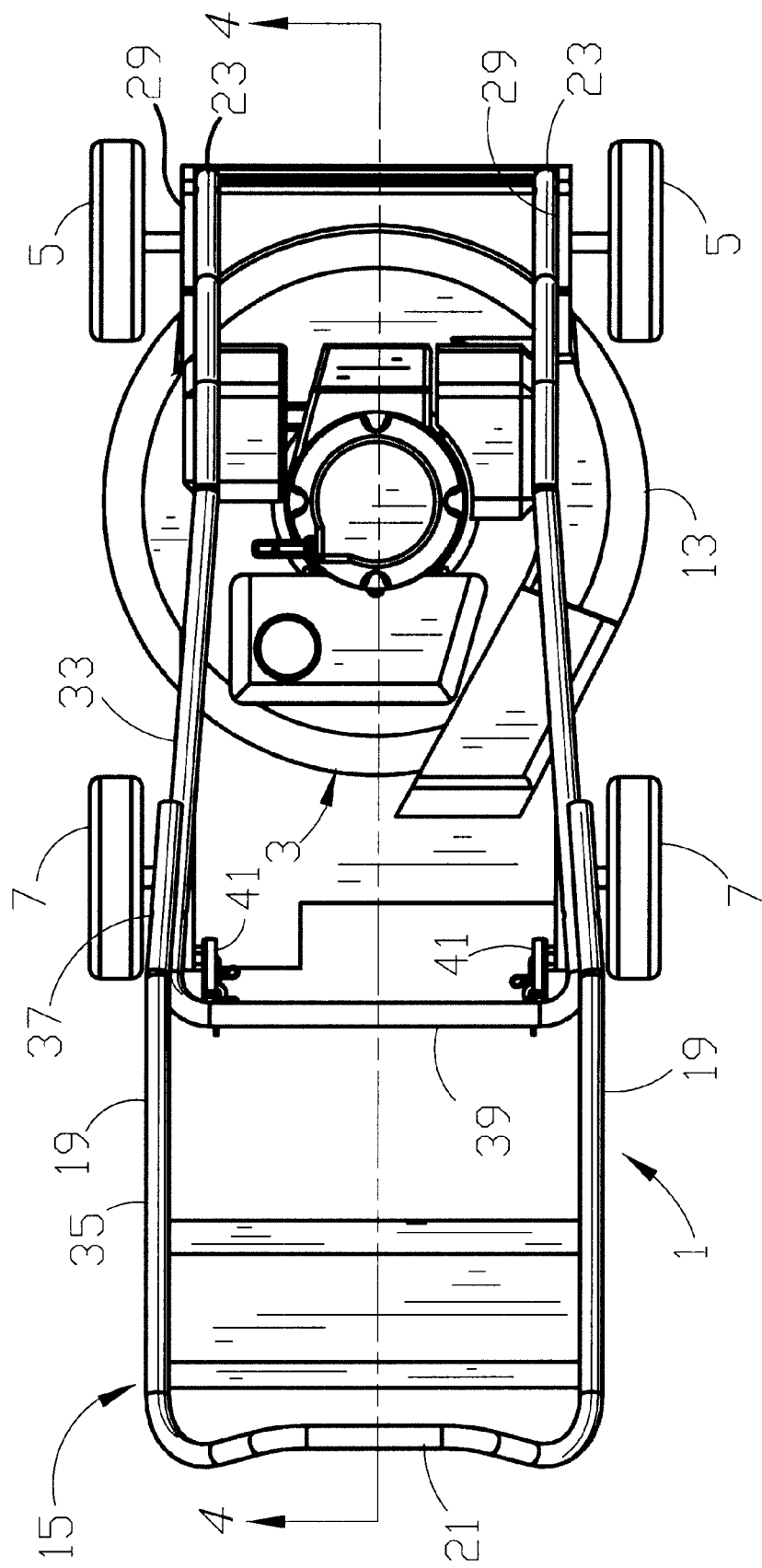
FIG. 3 is a top view of the lawnmower and handle assembly of FIG. 1.
Figure 4:
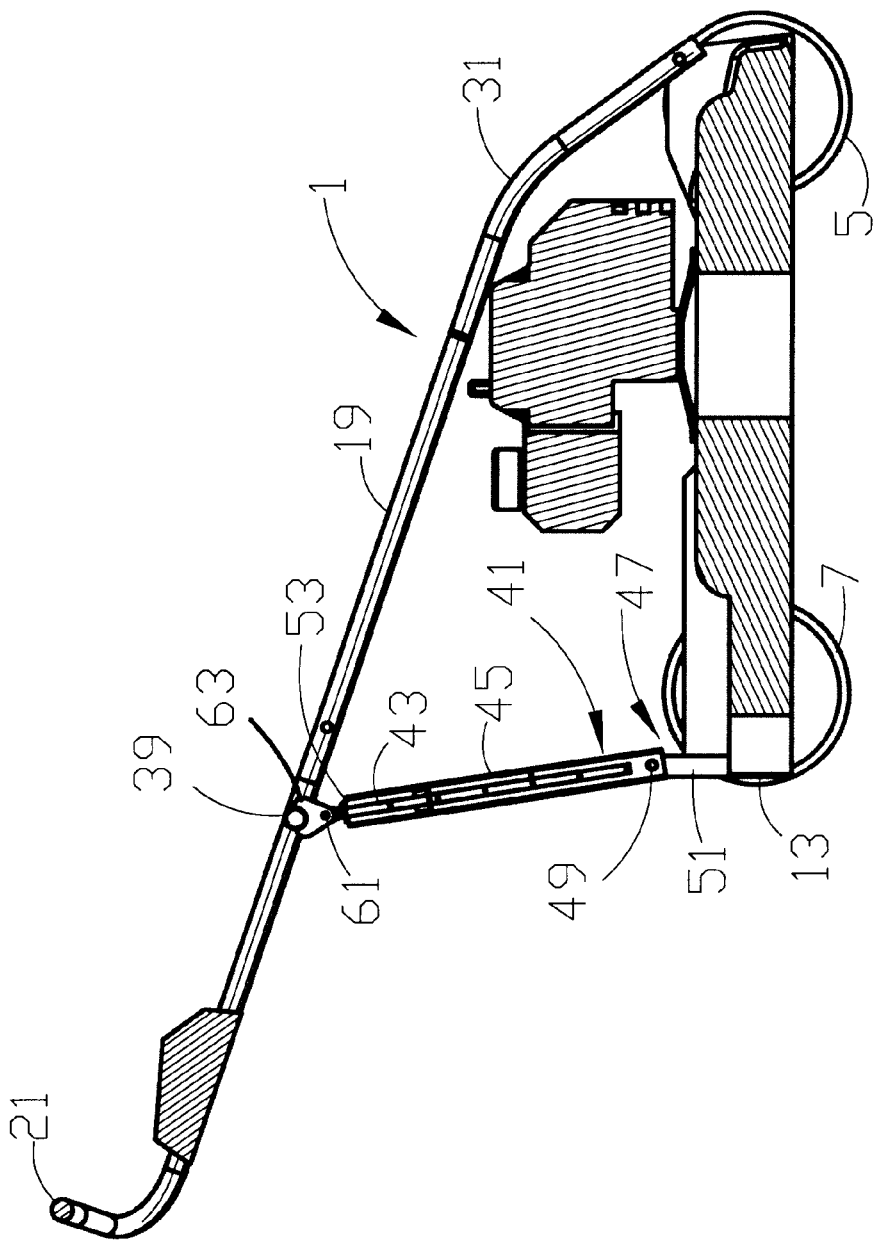
FIG. 4 is a cross-sectional view of the lawnmower and handle assembly of FIG. 1 taken generally along line 4—4 in FIG. 3.
Figure 5:
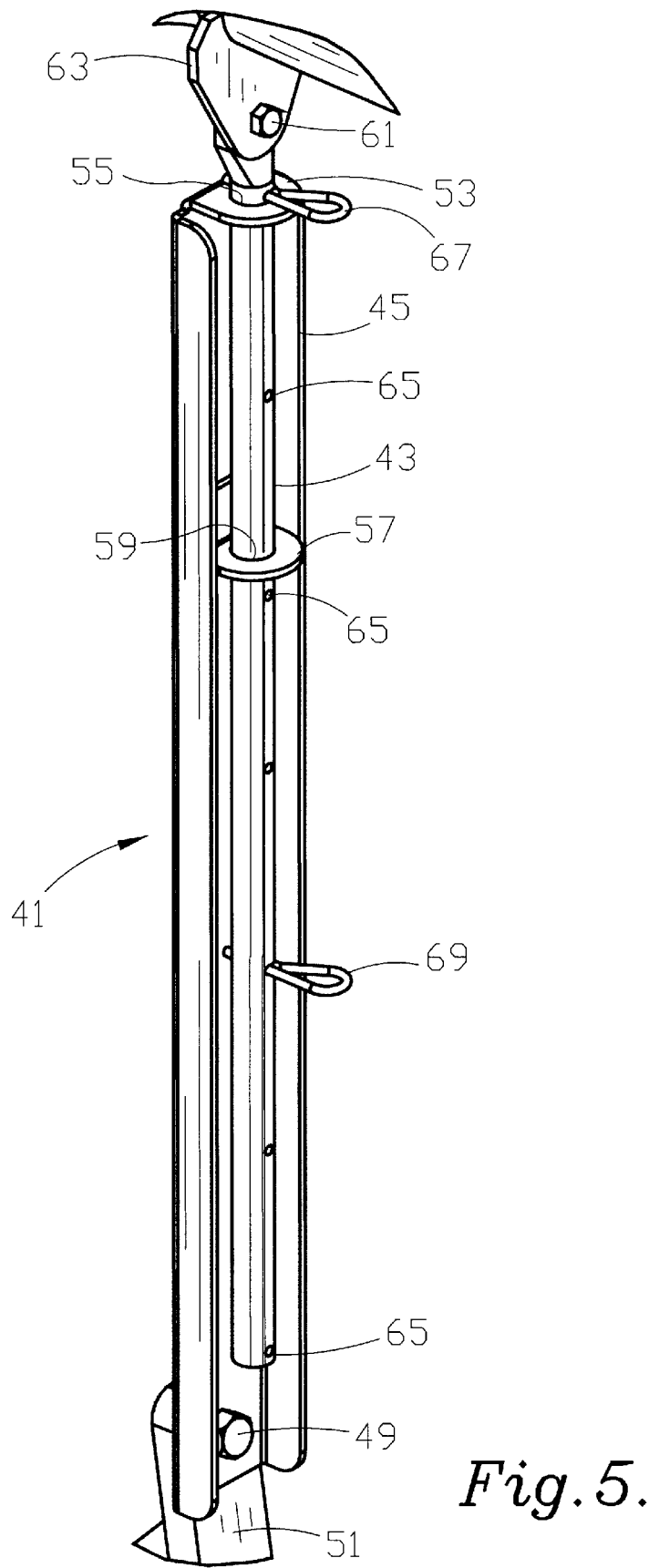
FIG. 5 is an enlarged perspective view of one of the telescoping handle height control assemblies of the handle assembly of FIG. 1.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly,"

"downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof Said terminology will include the words specifically mentioned, derivatives thereof and words of a similar import.

Referring to the drawings in more detail, the reference number 1 generally designates a handle assembly embodying the present invention. The handle assembly 1 is designed for use on an appliance 3 having at least one front wheel 5 and at least one rear wheel 7 which is propelled by being pushed by a human operator. The appliance 3 is generally depicted herein as being a power lawn mower having a mower deck 13, however the handle assembly 1 could easily be adapted for use on other appliances 3 including but not being limited to various types of handcarts and dollies.

The handle assembly 1 generally comprises a handlebar 15 and a handle height control mechanism 17. A critical feature of the handle assembly 1 is that the handlebar 15 is connected to the mower or other appliance 3 at the front end thereof, proximate the front wheels 5, instead of at the rear end, proximate the rear wheels 7, as is common practice in the industry. By connecting the handle assembly 1 to the front of the appliance 3, it becomes easier for the operator to push the appliance 3 because the force vector applied to the appliance 3 through the handlebar 15 is directed in a direction which is more forward and less downward than is the case with conventional rear-attached handle assemblies. This effort-reducing effect is especially noticeable when the operator attempts to push the appliance 3 up a hill or incline.

The handlebar 15 is formed of a strong, stiff material such as tubular steel, and is depicted herein as being generally U-shaped, however in other applications the handlebar 15 could take on other configurations, such as being T-shaped. In its generally U-shaped configuration the handlebar 15 has a pair of legs 19 connected by a generally horizontal crosspiece or push bar 21. Each leg 19 of the handlebar 15 has a distal end 23 which is preferably pivotally connected proximate the front end of the appliance 3 at a mounting point 25, such as by a pin 27 inserted into aligned receivers passing through the leg 19 and a respective upstanding flange 29 connected to the mower deck 13 proximate a respective front wheel 5. Pivotal mounting of the handlebar 15 allows the mower deck 13 to rise and fall with the terrain of the lawn while keeping the height of the push bar 21 at a relatively constant level which can be adjusted so as to accommodate operators of varying heights. It is foreseen, however, that in some circumstances a handlebar 15 which is fixedly connected to the appliance 3 might be acceptable or even preferable to pivotal mounting.

The legs 19 of the handlebar 15 each generally slope upwardly and rearwardly from the respective mounting point 25 toward the push bar 21 and preferably include an arcuate bend 31 which further accentuates the effort-reducing effect of the handle assembly 1 by flattening out the angle with respect to horizontal of both the handlebar 15 and the resultant force vector acting through the handlebar 15.

For purposes of shipping and storing the mower 3, the handlebar 15 preferably includes a lower handlebar section 33 and an upper handlebar section 35 connected by pivotal mountings 37. Both the lower handlebar section 33 and the upper handlebar section 35 are substantially U-shaped and have legs 19a and 19b respectively which form portions of the handlebar legs 19. The legs 19b of the upper handlebar section 35 are connected by the push bar 21, and the legs 19a of the lower handlebar section 33 are connected by an intermediate crossbar 39. The pivot mountings 37 can be constructed in any of a variety of known manners so that the upper handlebar section 35 is foldable relative to the lower handlebar section 33 between a retracted position and an extended position, and is lockable in the extended position.

The handle height control mechanism 17 serves to limit the range of movement of the handlebar 15 as it pivots about the front mounting points 25. It is desirable that the handlebar 15 be allowed to pivot as the mower 3 is pushed over irregularities in the ground, thereby allowing the push bar 21 to be held at a constant height which is comfortable for the operator. The range of movement, however, should have a lower limit which is set so as to allow the operator to push downward on the push bar 21 to raise the front wheels 5 of the mower 3 off of the ground and pivot the mower 3 about its rear wheels 7 for turning purposes. For the sake of safety, the upper limit of movement of the handlebar 15 should be set so as to prevent the handlebar 15 from pivoting so far forward as to allow the operator's feet from coming into contact with the mower blades.

While the height control mechanism 17 could take a variety of forms including something as simple as a length of chain or a hydraulic strut, it preferably comprises a pair of telescoping members 41 connected between the handlebar 15 and a suitable structure of the appliance 3, such as the mower deck 13. The telescoping members 41 each include an elongate inner member or rod 43 which is slidably mounted within a respective elongate outer member, channel or bracket 45.

The brackets 45 each have a lower end which is pivotally connected to the appliance 3 at a mounting point 47 proximate the rear wheels 7, such as by a pin 49 inserted in aligned receivers passing through the bracket 45 and a respective upstanding flange 51 fixedly connected to the mower deck 13. The upper ends of the brackets 45 each have a respective, generally horizontal, upper flange or limit stop 53 which includes a circular receiver 55 for accepting the rod 43. A lower flange or limit stop 57 fixedly connected to each bracket 45 and spaced downwardly from the top flange 53 includes a circular receiver 59 which also accepts the rod 43. It is foreseen that in some applications a single flange could function as both the upper lower limit stop 53 and the lower limit stop 57.

The rods 43 each have an upper end which is pivotally connected to the handlebar 15 intermediate the distal ends 23 of the legs 19 and the push bar 21, such as by a pin 61 inserted into aligned receivers passing through the rod 43 and a respective depending flange 63 connected to the intermediate crossbar 39. The lower ends of the rods 43 are each accepted by respective receivers 55 and 59 of the brackets 45, such that the rods 43 are slidably retained within the brackets 45 and telescope with respect to the brackets 45 as the handlebar 15 pivots about the pin 27 of the front mounting point 25.

Each of the rods 43 includes a plurality of longitudinally spaced adjustment holes 65 sized to receive upper and lower limit stop pins, such as hairpins 67 and 69 respectively, the upper hairpin 67 being placed through one of the adjustment holes 65 in a location above the bracket upper flange 53, and the lower hairpin 69 being placed through another of the adjustment holes 65 in a location below the bracket lower flange 57.

As the handlebar 15 pivots downward about the front mounting point 25, the upper hairpins 67 come into contact with the upper surfaces of the bracket upper flanges 53, thereby defining the lower limit of movement of the handlebar 15. Conversely, as the handlebar 15 pivots upward about the front mounting point 25, the lower hairpins 69 come into contact with the lower surface of the bracket lower flanges 57, thereby defining the upper limit of movement of the handlebar 15. Having a plurality of adjustment holes 65 in the rods 43 allows the telescoping members 41 to be adjusted so that the height of the push bar 21 and the range of movement of the handlebar 15 can be tailored to fit each individual operator. The adjustment is accomplished by simply relocating the upper and lower hairpins 67 and 69 to different adjustment holes 65.

Although the telescoping members 41 have been described herein as having a lower end of the outer member 45 connected to the appliance 3 and an upper end of the inner member 43 connected to the handlebar 15, it should be apparent to a person having ordinary skill in the art that this arrangement could be easily reversed so that a lower end of the inner member 43 is connected to the appliance 3 and an upper end of the outer member 45 is connected to the handlebar 15. Furthermore, the respective locations and configuration of the limit stops 51, 53 and the limit stop pins 67, 69 could be varied from the embodiment described herein; i.e. the limit stops 51, 53 could be connected to the inner member 43 instead of the outer member 45 and engage limit stop pins 67, 69 connected to the outer member 45. The limit stop pins 67, 69 could also be located between the limit stops 51, 53 instead of respectively above and below them. All that is required of the limit stops is that the pivoting action of the handlebar 15 be constrained between an upper limit and a lower limit if the handlebar 15 is pivotally connected to the appliance 3.

The handle assembly 1 can be sold either as original equipment on an appropriate appliance 3 or as an aftermarket add-on wherein an existing appliance 3 can be retrofitted with the improved handle assembly 1. Some existing lawnmower decks 13 are already equipped with the front mounting flanges 29 required for mounting the handlebar 15, needing only to have a receiver bored there through for receiving the pivot pin 27. Other existing mower decks 13 lack the flanges 29, but in these instances flanges 29 can be added to the deck 13 by being bolted on or otherwise attached. In most cases, the existing rear-mount handlebar attaching points can be used to form the rear mounting points 47 for connecting the height control mechanism 17 to the mower deck 13.

It is to be understood that while certain forms of the present invention have been illustrated and described herein, it is not to be limited to the specific forms or arrangement of parts described and shown. For example, it is foreseen that the handle height control mechanism 17 could take on an entirely different configuration from the telescoping members 41 described herein, and it is not required that it be connected to the appliance 3 proximate the rear wheels 7. A front mounting point 25 which allows the handlebar 15 to pivot between fixed upper and lower limits would also provide a handle assembly 1 within the scope of the present invention.

What is claimed and desired to be secured by Letters Patent is as follows:

1. A handle assembly for an appliance having at least one front wheel at a front end of said appliance and at least one rear wheel at a rear end of said appliance and adapted for pushing by a human operator, said handle assembly comprising:
   a) a handlebar pivotally connectable to the appliance at a front mounting point proximate the appliance front end and extending upwardly and rearwardly therefrom and terminating with a generally horizontal push bar adapted for gripping by the operator; and
   b) a handle height control mechanism connectable at a lower end to the appliance at a rear mounting point proximate the appliance rear end and at an upper end to said handlebar intermediate the front mounting point and said push bar, said handle height control mechanism allowing said handlebar to pivot about the front mounting point through a limited range of movement while said appliance is being propelled by the operator.

2. The handle assembly as in claim 1, wherein said handlebar includes an arcuately bowed portion, an upper portion above said arcuately bowed portion, and a lower portion below said arcuately bowed portion, the angle between said upper portion of said handlebar and horizontal being less than the angle between said lower portion of said handlebar and horizontal.

3. The handle assembly as in claim 1, wherein:
   a) said handle height control mechanism comprises a telescoping assembly having an inner member slidably received within an outer member;
   b) said mechanism lower end comprises a distal end of said outer member, said outer member distal end being pivotally connectable to the appliance at the rear mounting point; and
   c) said mechanism upper end comprises a distal end of said inner member, said inner member distal end being pivotally connected to said handlebar.

4. The handle assembly as in claim 3, wherein:
   a) said telescoping assembly outer member includes an upper limit stop and a lower limit stop;
   b) a first limit stop pin is connected to said inner member above said upper limit stop and a second limit stop pin is connected to said inner member below said lower limit stop; and
   c) said first limit stop pin engages said upper limit stop to prevent further downward movement of said handlebar when said handlebar reaches a lower limit of said handlebar range of movement and said second limit stop pin engages said lower limit stop to prevent further upward movement of said handlebar when said handlebar reaches an upper limit of said handlebar range of movement.

5. The handle assembly as in claim 4, wherein said telescoping assembly inner member includes a plurality of longitudinally spaced adjustment holes and said first and second limit stop pins are removably received by respective ones of said adjustment holes, said lower and upper limits of said handlebar range of movement being respectively adjustable by moving said first and second limit stop pins to different ones of said adjustment holes.

6. The handle assembly as in claim 1, wherein:
   a) said handlebar is substantially U-shaped, having first and second legs connected by a crosspiece with said crosspiece serving as said push bar;
   b) said front mounting point is a first front mounting point proximate a first appliance front wheel and said handlebar is pivotally connectable to the appliance at the first front mounting point through said first leg; and
   c) said handlebar is further pivotally connectable to the appliance at a second front mounting point proximate a second appliance front wheel through said second leg.

7. The handle assembly as in claim 6, wherein each said leg of said handlebar includes an arcuately bowed portion, an upper portion above said arcuately bowed portion, and a lower portion below said arcuately bowed portion, the angle between said upper portion of each said leg and horizontal being less than the angle between said lower portion of each said leg and horizontal.

8. The handle assembly as in claim 6, wherein:
 a) said rear mounting point is a first rear mounting point and said handle height control mechanism is further connectable to the appliance at a second rear mounting point, each of the rear mounting points being proximate a respective appliance rear wheel;
 b) said handle height control mechanism comprises a pair of telescoping assemblies, each having an inner member slidably received within an outer member;
 c) said mechanism lower end comprises a distal end of each said outer member, each said outer member distal end being pivotally connectable to the appliance at a respective rear mounting point; and
 d) said mechanism upper end comprises a distal end of each said inner member, each said inner member distal end being pivotally connected to a respective leg of said U-shaped handlebar.

9. The handle assembly as in claim 8, wherein:
 a) each said telescoping assembly outer member includes an upper limit stop and a lower limit stop;
 b) a respective first limit stop pin is connected to each said inner member above said upper limit stop and a respective second limit stop pin is connected to each said inner member below said lower limit stop; and
 c) said first limit stop pins engage said upper limit stops to prevent further downward movement of said handlebar when said handlebar reaches a lower limit of said handlebar range of movement and said second limit stop pins engage said lower limit stops to prevent further upward movement of said handlebar when said handlebar reaches an upper limit of said handlebar range of movement.

10. The handle assembly as in claim 9, wherein each said telescoping assembly inner member includes a plurality of longitudinally spaced adjustment holes and said first and second limit stop pins are removably received by respective ones of said adjustment holes, said lower and upper limits of said handlebar range of movement being respectively adjustable by moving said first and second limit stop pins to different ones of said adjustment holes.

11. The handle assembly as in claim 6, wherein each said leg of said U-shaped handlebar includes a pivot mount such that said handlebar is foldable between a retracted position and an extended position, said pivot mounts being lockable in said extended position.

12. A lawnmower adapted for pushing by an operator and comprising:
 a) a mower deck;
 b) at least one front wheel rotatably connected to and supporting said mower deck at a front end thereof and at least one rear wheel rotatably connected to and supporting said mower deck at a rear end thereof;
 c) a handlebar pivotally connected to said lawnmower at a front mounting point proximate said front end of said mower deck and extending upwardly and rearwardly therefrom and terminating with a push bar adapted for gripping by the operator; and
 d) a handle height control mechanism connected at a lower end to said lawnmower at a rear mounting point proximate said rear end of said mower deck and at an upper end to said handlebar, said handle height control mechanism allowing said handlebar to pivot about the front mounting point through a limited range of movement while said lawnmower is being propelled by the operator.

13. The lawnmower as in claim 12, wherein:
 a) said handle height control mechanism comprises a telescoping assembly having a first member slidably secured to a second member; a distal end of said first member being pivotally connected to said mower deck at said rear mounting point; and a distal end of said second member being pivotally connected to said handlebar.

14. The lawnmower as in claim 12, wherein:
 a) said telescoping assembly includes upper limit stop means for preventing said handlebar from pivoting beyond an upper limit of the limited range of motion of said handlebar, and said telescoping assembly includes lower limit stop means for preventing said handlebar from pivoting beyond a lower limit of the limited range of motion of said handlebar.

15. The lawnmower as in claim 14 further comprising:
 a) means for adjusting the upper limit of the limited range of motion of said handlebar established by said upper limit stop means.

16. The lawnmower as in claim 14, further comprising:
 a) means for adjusting the lower limit of the limited range of motion of said handlebar established by said lower limit stop means.

17. A handle assembly for an appliance having at least one front wheel at a front end of said appliance and at least one rear wheel at a rear end of said appliance and adapted for pushing by a human operator, said handle assembly comprising:
 a) a handlebar pivotally connectable to the appliance at a front mounting point proximate the appliance front end and extending upwardly and rearwardly therefrom and terminating at a push bar adapted for gripping by the operator; and
 b) a handle height control mechanism connectable at a lower end to the appliance at a rear mounting point proximate the appliance rear end and at an upper end to said handlebar, said handle height control mechanism allowing said handlebar to pivot about the front mounting point through a limited range of movement while said appliance is being propelled by the operator.

18. The handle assembly for an appliance as in claim 17, wherein:
 a) said handle height control mechanism comprises a telescoping assembly having a first member slidably secured to a second member, a distal end of said first member being pivotally connectable to said appliance at said rear mounting point, and a distal end of said second member being pivotally connected to said handlebar.

19. The lawnmower as in claim 18, wherein:
 a) said telescoping assembly includes upper limit stop means for preventing said handlebar from pivoting beyond an upper limit of the limited range of motion of said handlebar, and said telescoping assembly including lower limit stop means for preventing said handlebar from pivoting beyond a lower limit of the limited range of motion of said handlebar.

20. The lawnmower as in claim 19 further comprising:
 a) means for adjusting the upper limit of the limited range of motion of said handlebar established by said upper limit stop means.

21. The lawnmower as in claim 19 further comprising:
   a) means for adjusting the lower limit of the limited range of motion of said handlebar established by said lower limit stop means.

22. A lawnmower adapted for pushing by a human operator and comprising:
   a) a mower deck;
   b) at least one front wheel rotatably connected to and supporting said mower deck at a front end thereof and at least one rear wheel rotatably connected to and supporting said mower deck at a rear end thereof;
   c) a handlebar pivotally connected to said lawnmower at a front mounting point proximate said front end of said mower deck and extending upwardly and rearwardly therefrom and terminating with a push bar adapted for gripping by the operator; said handlebar pivotable relative to said mower deck while said lawnmower is being propelled by the operator; and
   d) lower limit stop means for preventing said handlebar from pivoting beyond a lower limit of a limited range of motion of said handlebar, and upper limit stop means for preventing said handlebar from pivoting beyond an upper limit of a limited range of motion of said handlebar.

23. The lawnmower as in claim 22 further comprising:
   a) means for adjusting the upper limit of the limited range of motion of said handlebar established by said upper limit stop means.

24. The lawnmower as in claim 22 further comprising:
   a) means for adjusting the lower limit of the limited range of motion of said handlebar established by said lower limit stop means.

25. A lawnmower adapted for pushing by a human operator and comprising:
   a) a mower deck;
   b) at least one front wheel rotatably connected to and supporting said mower deck at a front end thereof and at least one rear wheel rotatably connected to and supporting said mower deck at a rear end thereof;
   c) a handlebar pivotally connected to said lawnmower at a front mounting point proximate said front end of said mower deck and extending upwardly and rearwardly therefrom and terminating with a push bar adapted for gripping by the operator; said handlebar pivotable relative to said mower deck while said lawnmower is being propelled by the operator; and
   d) a handle height control mechanism connected to said mower deck and comprising a lower limit stop adapted to prevent said handlebar from pivoting beyond a lower limit of a limited range of motion of said handlebar and an upper limit stop adapted to prevent said handlebar from pivoting beyond an upper limit of a limited range of motion of said handlebar.

26. The lawnmower as in claim 25 further comprising:
   a) means for adjusting the upper limit of the limited range of motion of said handlebar established by said upper limit stop means.

27. The lawnmower as in claim 25 further comprising:
   a) means for adjusting the lower limit of the limited range of motion of said handlebar established by said lower limit stop means.

* * * * *